United States Patent [19]

Ogawa et al.

[11] Patent Number: 5,582,878
[45] Date of Patent: Dec. 10, 1996

[54] PROCESS FOR PRODUCING MAGNETIC RECORDING MEDIUM

[75] Inventors: Shin-ichi Ogawa; Hiroshi Ohsawa; Hideo Yashima, all of Ichihara, Japan

[73] Assignee: Showa Denko Kabushiki Kaisha, Tokyo, Japan

[21] Appl. No.: 621,450

[22] Filed: Mar. 25, 1996

[30] Foreign Application Priority Data

| Mar. 24, 1995 | [JP] | Japan | 7-089991 |
| Mar. 24, 1995 | [JP] | Japan | 7-089992 |
| May 18, 1995 | [JP] | Japan | 7-142410 |
| May 18, 1995 | [JP] | Japan | 7-142411 |
| Jun. 1, 1995 | [JP] | Japan | 7-156722 |
| Jun. 1, 1995 | [JP] | Japan | 7-156723 |

[51] Int. Cl.$^6$ ................................................. B05D 3/00
[52] U.S. Cl. .................. 427/554; 427/129; 427/131; 427/132; 427/314; 427/404; 427/407.2; 427/558; 427/559; 427/596
[58] Field of Search ................................ 427/554, 558, 427/559, 596, 129, 131, 132, 314, 404, 407.2

[56] References Cited

U.S. PATENT DOCUMENTS

| 5,062,021 | 10/1991 | Ranjan et al. | 360/135 |
| 5,108,781 | 4/1992 | Ranjan et al. | 427/53.1 |

FOREIGN PATENT DOCUMENTS

0652554A1  5/1995  European Pat. Off. .

*Primary Examiner*—Bernard Pianalto
*Attorney, Agent, or Firm*—Sughrue, Mion, Zinn, Macpeak & Seas

[57] ABSTRACT

A magnetic recording medium having an improved CSS characteristics is made by a process including a surface texture treatment step of either (1) focusing an ultraviolet laser beam in a ring-shaped band, or (2) focusing a pulsed ultraviolet laser beam at an energy density of at least 0.01 J/cm$^2$ but lower than the threshold level successively at least two times but up to 1,000 times, on a substrate composed of glass or silicon, followed by the formation of an undercoat, a magnetic layer, and a protective coating in this order on the surface-textured substrate.

9 Claims, 2 Drawing Sheets

PROCESS FOR PRODUCING MAGNETIC RECORDING MEDIUM

BACKGROUND OF THE INVENTION (1) Field of the Invention

This invention relates to a process for producing a magnetic recording medium. More particularly, it relates to a process for producing a magnetic recording medium exhibiting an enhanced durability against wear due to sliding contact of the magnetic hard disc (hereinafter referred to as "HD") with a magnetic head.

(2) Description of the Related Art

The recent progress of increasing the density of magnetic recording mediums is remarkable. It was said before that the rate of density increase of hard disc drives (hereinafter referred to as "HDD") is about 10 times per 10 years, but now it may be said that the rate of density increase is about 100 times per 10 years.

In HDD, there is adopted mainly a Winchester system, i.e., CSS (contact start-stop) system involving a basic operation of a sliding movement due to contact of HD with a magnetic head, flying of the head and then a sliding movement due to contact of HD with the head. The CSS system has contributed in no small measure to the amazing progress in increase of recording density. However, this system has invited an attractive problem of tribology. Namely, the amazing progress in increase of recording density has invited an increase of rotational speed of the disc and a reduction of flying height of the magnetic head. Thus, there is now an increasing demand for improving head-and-disc wear characteristics and stability in sliding movement, and for enhancing smoothness of the HD surface.

The key to the improvement of head-and-disc wear characteristics lies in an increase of the tenacity of materials and a lowering of friction coefficient or an enhancement of lubrication. As regards HD, attempts have been made for lowering the friction coefficient by rendering rough the HD surface, and for coating the HD with a protective coating material such as diamond-like carbon (DLC) or a coating lubricating agent. The surface treatment for lowering the friction coefficient is referred to as a "texture treatment" and is intended to effectively reduce the contact area in the CSS system whereby the head-and-disc wear characteristics are improved. The texture treatment comprises forming peaks and indentations or valleys having predetermined height and depth on the textured HD surface, and now the texture treatment is an essential step for the HD production.

The texture treatment greatly depends upon the particular material of the disc substrate. For example, in the case of a nickel-phosphorus (Ni—P)-coated aluminum substrate, the surface roughening is effected by mechanical grinding using an abrasive grain. In the case of a glass substrate, etching techniques utilizing lithography or a combination of lithography with printing have been proposed and a part thereof have been practically adopted.

In the texture treatment, there are problems inconsistent with each other, i.e., it is difficult to precisely control the surface roughness with an enhanced production efficiency. Namely, the mechanical grinding has technical problems of over-grinding or burr formation, and blurring of textured areas, and the lithographic etching has a problem that the production steps are complicated.

In recent years texture treatments utilizing laser beam such as laser ablation and laser etching have attracted attention (see, for example, U.S. Pat. No. 5,062,021 and Japanese Unexamined Patent Publication No. 62-209,798). The laser beam texturing is advantageous in that the surface roughness can be precisely controlled and the production steps are conducted in a dry state without use of a liquid. The kinds of laser beams, wavelengths and energy densities are selected depending upon the particular material of the substrate treated.

When the laser beam texturing is conducted for substitute substrates such as glass and silicon substrates, if the kinds of laser beams, wavelengths and energy densities are not appropriately selected, it is highly possible that flied powders are undesirably deposited or over-etching occurs with the results that cracks are caused and the CSS characteristics are deteriorated.

SUMMARY OF THE INVENTION

In view of the foregoing, a primary object of the present invention is to provide a process for producing a magnetic recording medium whereby the surface texture treatment utilizing laser beam can be conducted with a minimized possibility of crack occurrence and deterioration of the CSS characteristics.

In one aspect of the present invention there is provided a process for producing a magnetic recording medium comprising a surface texture treatment step of focusing an ultraviolet laser beam in a ring-shaped band on a substrate composed of glass or silicon, followed by the formation of an undercoat, a magnetic layer, and a protective coating in this order on the surface-textured substrate.

In another aspect of the present invention, there is provided a process for producing a magnetic recording medium comprising a surface texture treatment step of focusing a pulsed ultraviolet laser beam at an energy density of at least 0.01 J/cm$^2$ but lower than the threshold level successively at least two times but up to 1,000 times on a substrate composed of glass or silicon, followed by the formation of an undercoat, a magnetic layer, and a protective coating in this order on the surface-textured substrate.

DETAILED DESCRIPTION OF PREFERRED EMBODIMENTS

Figure 1:
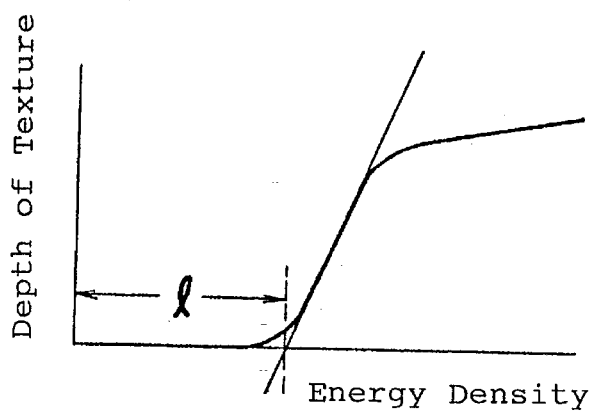
FIG. 1 is a chart illustrating the relationship of the energy density of a laser beam with the magnitude of texture.

In FIG. 1, the ordinate expresses the depth of texture and the abscissa expresses the energy density of laser beam, and the length "1" expresses the threshold level. When a laser beam is focused on materials such as ceramics and polymeric materials, when the energy density of laser beams exceeds the threshold level, the magnitude of texture, i.e., the height and depth of peaks and indentations, rapidly increases. It is known that, when a pulsed laser beam is continuously concentrated at a level lower than the threshold level, conical protrusions (referred to as cone-shaped structures) are produced (see Journal of Applied Physics, vol. 49, p453 (1986)).

In the process of the present invention, it is essential that a texture treatment step of focusing either (1) an ultraviolet laser beam in a ring-shaped band, or (2) a pulsed ultraviolet laser beam at an energy density of at least 0.01 J/cm$^2$ but lower than the threshold level successively at least two times but up to 1,000 times, on a substrate composed of glass or silicon, is conducted prior to the formation of an undercoat, a magnetic layer, and a protective coating in this order on the substrate. By this surface texture treatment, peaks having desired height and shape are formed whereby HD is afforded which has improved head-and-disc wear characteristics and is suitable for the CSS system wherein an operation of start-sliding movement- flying-sliding movement-stop is repeated. The ultraviolet laser is provided by, for example, YAG or an excimer.

Figure 2:
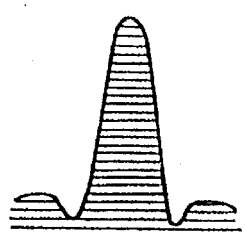
FIG. 2 is a schematic view showing a profile of the surface having peaks formed by a laser beam texturing in accordance with the present invention.
Figure 3:
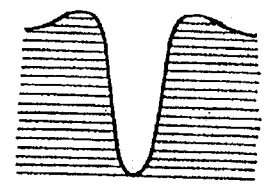
FIG. 3 is a schematic view showing a profile of the surface having indentations or valleys formed by a laser beam texturing at an energy density of at least the threshold level.
Figure 4:
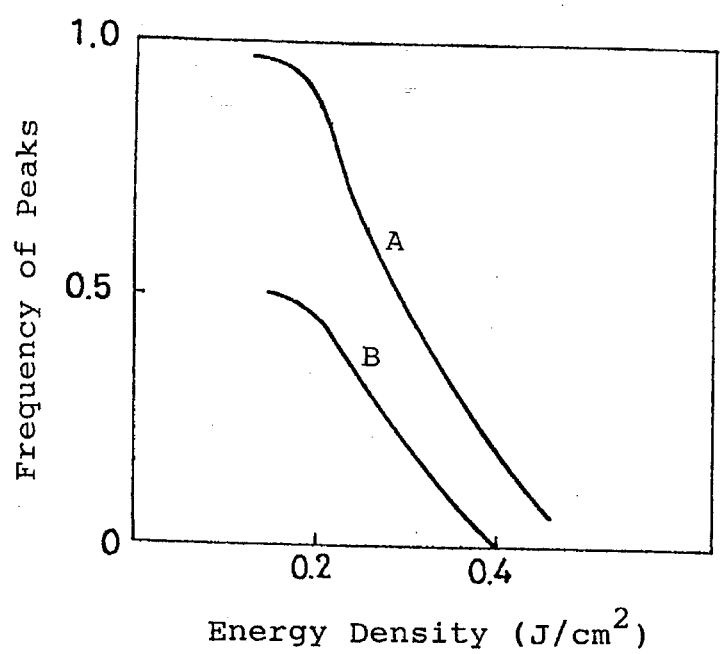
FIG. 4 is a graph illustrating the relationship of frequency of peaks and indentations on the textured surface with the energy density of laser beam in accordance with the present invention utilizing a ring-shaped laser beam focusing (curve A) as compared to the conventional texture treatment utilizing a spot laser beam forcusing (curve B)

In the first embodiment wherein an ultraviolet laser beam is focused in a ring-shaped band on a glass or silicon substrate, as illustrated with a curve (A) in FIG. 4, the ratio (a)/[(a)+(b)] (ordinate) wherein (a) is frequency of peaks as illustrated in FIG. 2 and (b) is frequency of indentations as illustrated in FIG. 3, rapidly decreases with an increase of the energy density of laser beam (J/cm$^2$, abscissa), when the energy density exceeds a certain value. It is presumed that the extent of peak spreading can be controlled by the concentration of ultraviolet laser beam into a ring-shaped band, and consequently, deposits produced by laser ablation are liable to be concentrated on the center of the ring-shaped band with the result that high peaks having a substantially uniform shape are formed on the surface.

In contrast, in the conventional texture treatment wherein spot laser beams are focused, as illustrated with a curve (B) in FIG. 4, the ratio (a)/[(a)+(b)] (ordinate) rather gently decreases with an increase of the energy density of laser beam (J/cm$^2$, abscissa), when the energy density exceeds a certain value. It is presumed that the concentration of energy is not constant, and thus, the peak formation is not stable and the formed peaks are not uniform.

The method of focusing of laser beams in a ring-shaped band is not particularly limited, but there are preferably adopted a method utilizing an axicon prism, a masking method and a method utilizing a convergent bundle of rays by grating. In the method utilizing an axicon prism and the masking method, the size and shape of produced peaks can be adjusted by suitably selecting the axicon prism, the mask, the geometrical conditions for beam concentration, and the laser energy density.

The ring-shaped band of the laser beam is preferably has an outer diameter of 3 to 100 μm, more preferably 5 to 50 μm, and a band width of 1 to 30 μm, more preferably 2 to 10 μm.

Figure 5:
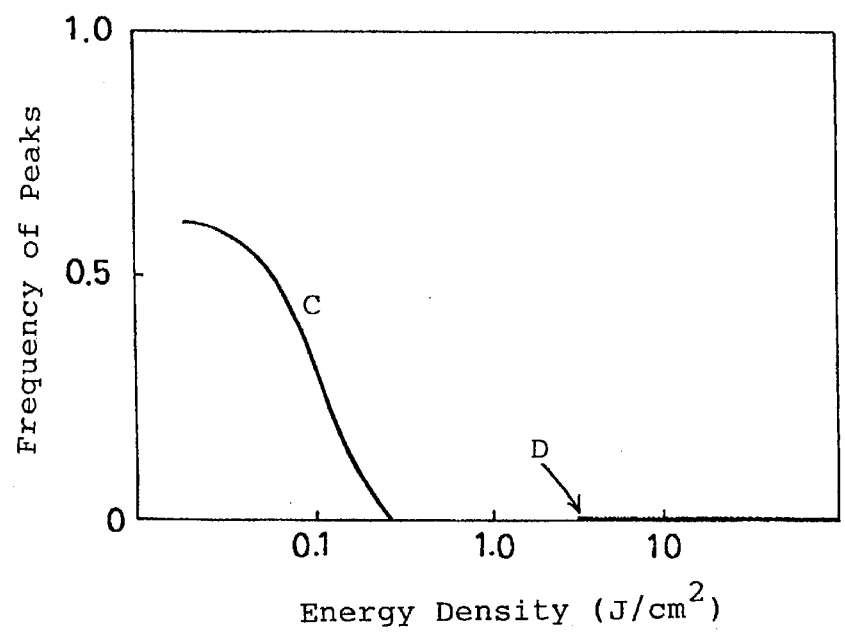
FIG. 5 is a graph illustrating the relationship of frequency of peaks and indentations on the textured surface with the energy density of laser beam in accordance with the present invention utilizing a pulsed laser beam focussing (curve C) as compared to the conventional texture treatment utilizing a single laser beam forcusing (line D)

In the second embodiment wherein a pulsed ultraviolet laser beam at an energy density of at least 0.01 J/cm$^2$ but lower than the threshold level is focused on a glass or silicon substrate successively a plurality of times, as illustrated with a curve (C) in FIG. 5, the ratio (a)/[(a)+(b)] (ordinate) wherein (a) is frequency of peaks as illustrated in FIG. 2 and (b) is frequency of valleys as illustrated in FIG. 3, rapidly decreases with an increase of the energy density of laser beam (J/cm$^2$, abscissa), when the energy density exceeds a certain value. By the successive focusing of a pulsed laser beam with an energy density not exceeding the threshold value, a desired amount of peaks can be formed and the size and frequency of peaks can be controlled to a desired extent.

If a single laser beam is focused, as illustrated with a line (D) in FIG. 5, a desired amount of peaks cannot be formed. The times of pulsed laser beam forcusing should not exceed 1,000. The successive focusing of a pulsed laser beam exceeding 1,000 times is not preferable in view of a reduced throughput. Preferably the times of pulsed laser beam forcusing is in the range of 2 to 100 times.

Even if the energy density employed is smaller than 0.01 J/cm$^2$, a surface texturing can be carried out, but the peaks formed do not have a height of the desired level. A preferable energy density is in the range of 0.02 to 0.2 J/cm$^2$.

In both of the first and second embodiments, it is preferable that the focusing of laser beams is conducted so that the adjacent focused areas do not overlap with each other. When the adjacent focused areas overlap with each other, irregularity of the peaks produced is enhanced and the wear characteristics of HD become poor. In contrast, when the adjacent focused areas are far apart from each other, regions where peaks are not produced are large, and thus, the contact area of HD with a magnetic head increases and the wear characteristics of HD are deteriorated.

If the height of the peaks is too large, collision of HD with a magnetic head frequently occurs and also the wear characteristics of HD are deteriorated. Preferably the peaks produced have an outer diameter of 1 to 50 μm and a height of 1 to 100 nm, and the ratio of the areas which the peaks occupy to the total surface area of the substrate is in the range of 0.1 to 99.9%, preferably 1 to 20%.

In the present invention, a glass or silicon substrate is used as a non-magnetic substrate. As examples of available glass, there can be mentioned crystallized glass, and chemically strengthened glass such as soda-lime glass and aluminosilicate glass. As the silicon substrate, a substrate composed of single crystal or polycrystalline of silicon is used.

Usually, a undercoat, a magnetic coating, a protective coating and a lubricating coating are formed in this order on the surface-textured substrate. The procedures, conditions and materials employed for forming these coatings are not particularly limited, and may be conventional.

The present invention will now be described by the following examples that by no means limit the scope of the claims of the invention.

Figure 6:
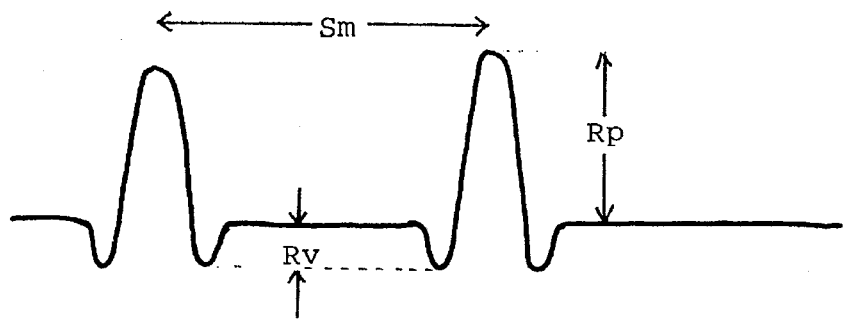
FIG. 6 is a schematic view showing a profile of the textured surface having peaks for explaining the parameters used for evaluating the surface roughness.

In the following examples and comparative examples, the surface roughness of textured substrates was measured by using a stylus type surface roughness meter at a stylus of 0.5 μm and a cut-off of 0.25 mm. The parameters "peak height (Rp)", "valley depth (Rv)" and "distance between peaks (Sm)" means the distance from the level of untextured surface to the top end of peak, the distance from the level of untextured surface to the bottom end of valley or indentation, and the distance between the central axes of two adjacent peaks, respectively, as illustrated in FIG. 6.

The CSS characteristics of magnetic recording mediums were evaluated by measuring the stiction value after 10,000 CSS cycles. For this measurement, a commercially available CSS tester and an $Al_2O_3$-TiC slider head as the magnetic head were used.

EXAMPLE 1

An ultraviolet laser beam was focused at 50 pulses on a substrate composed of soda lime glass by using the fourth harmonic generations (266 nm) of YAG laser and an axicon prism at an energy density of 0.2 J/cm² and a pulse width of 20 ns. The focusing was conducted so that the laser beam was focused in ring-shaped bands each having an outer diameter of 10 μm and a band width of 2 μm.

Thus, there were formed peaks and indentations on the textured surface, 95% of which were peaks having an average peak height (Rp) of 25 nm, an average valley depth (Rv) shallower than −1 nm, an average outer diameter of 7 μm, and an average distance (Sm) between peaks of about 25 μm.

On the thus-textured glass substrate, a chromium undercoat having a thickness of 100 nm, a magnetic layer composed of a $Co_{17}Cr_4Ta$ alloy having a thickness of 20 nm and a protective carbon coating having a thickness of 20 nm were formed in this order at a substrate temperature of 200° C. by sputtering. Finally a perfluoro-polyether (PFPE) lubricant was coated thereon to obtain a magnetic recording medium.

EXAMPLE 2

An ultraviolet laser beam was focused at 80 pulses on a substrate composed of soda lime glass by using a KrF excimer laser (248 nm) and a mask at an energy density of 0.1 J/cm² and a pulse width of 15 ns. The focusing was conducted so that the laser beam was focused in ring-shaped bands each having an outer diameter of 10 μm and a band width of 2 μm.

Thus, there were formed peaks and indentations on the textured surface, 90% of which were peaks having an average peak height (Rp) of 23 nm, an average valley depth (Rv) shallower than −1 nm, an average outer diameter of 6 μm, and an average distance (Sm) between peaks of about 35 μm.

A magnetic recording medium was produced by the same procedures as described in Example 1 on the thus-textured glass substrate.

EXAMPLE 3

An ultraviolet laser beam was focused at 50 pulses on a silicon substrate by using the fourth harmonic generations (266 nm) of YAG laser and an axicon prism at an energy density of 0.02 J/cm² and a pulse width of 20 ns. The focusing was conducted so that the laser beam was focused in ring-shaped bands each having an outer diameter of 10 μm and a band width of 2 μm.

Thus, there were formed peaks and indentations on the textured surface, 85% of which were peaks having an average peak height (Rp) of 27 nm, an average valley depth (Rv) shallower than −1.5 nm, an average outer diameter of 5.5 μm, and an average distance (Sm) between peaks of about 40 μm.

A magnetic recording medium was produced by the same procedures as described in Example 1 on the thus-textured silicon substrate.

EXAMPLE 4

An ultraviolet laser beam was focused at 80 pulses on a silicon substrate by using a KrF excimer laser (248 nm) and a mask at an energy density of 0.03 J/cm² and a pulse width of 15 ns. The focusing was conducted so that the laser beam was focused in ring-shaped bands each having an outer diameter of 10 μm and a band width of 2 μm.

Thus, there were formed peaks and indentations on the textured surface, 80% of which were peaks having an average peak height (Rp) of 30 nm, an average valley depth (Rv) shallower than −2 nm, an average outer diameter of 5.5 μm, and an average distance (Sm) between peaks of about 40 μm.

A magnetic recording medium was produced by the same procedures as described in Example 1 on the thus-textured silicon substrate.

Comparative Example 1

An ultraviolet laser beam having a diameter of 10 μm was focused at 50 pulses on a substrate composed of soda lime glass by using the fourth harmonic generations (266 nm) of YAG laser at an energy density of 0.2 J/cm² and a pulse width of 20 ns. Thus, there were formed peaks and indentations on the textured surface, 50% of which were peaks having an average peak height (Rp) of 28 nm, an average valley depth (Rv) shallower than −1 nm, an average outer diameter of 7 μm, and an average distance (Sm) between peaks of about 35 μm, and the remainder of which were indentations having an average valley depth (Rv) of −100 nm.

A magnetic recording medium was produced by the same procedures as described in Example 1 on the thus-textured glass substrate.

Comparative Example 2

An ultraviolet laser beam having a diameter of 10 μm was focused at 50 pulses on a silicon substrate by using the fourth harmonic generations (266 nm) of YAG laser at an energy density of 0.02 J/cm² and a pulse width of 20 ns. Thus, there were formed peaks and indentations on the textured surface, 40% of which were peaks having an average peak height (Rp) of 25 nm, an average valley depth (Rv) shallower than −1 nm, an average outer diameter of 5.5 μm, and an average distance (Sm) between peaks of about 35 μm, and the remainder of which were indentations having an average valley depth (Rv) of −150 nm.

A magnetic recording medium was produced by the same procedures as described in Example 1 on the thus-textured silicon substrate.

Comparative Example 3

An ultraviolet laser beam having a diameter of 10 μm was focused at 80 pulses on a substrate composed of soda lime glass by using a KrF excimer laser (248 nm) and a mask at an energy density of 0.2 J/cm² and a pulse width of 15 ns. Thus, there were formed peaks and indentations on the textured surface, 40% of which were peaks having an average peak height (Rp) of 27 nm, an average valley depth (Rv) shallower than −1 nm, an average outer diameter of 6 μm, and an average distance (Sm) between peaks of about 40 μm, and the remainder of which were indentations having an average valley depth (Rv) of −150 nm.

A magnetic recording medium was produced by the same procedures as described in Example 1 on the thus-textured glass substrate.

Comparative Example 4

An ultraviolet laser beam having a diameter of 10 μm was focused at 80 pulses on a silicon substrate by using a KrF excimer laser (248 nm) and a mask at an energy density of 0.03 J/cm$^2$ and a pulse width of 15 ns. Thus, there were formed peaks and indentations on the textured surface, 30% of which were peaks having an average peak height (Rp) of 23 nm, an average valley depth (Rv) shallower than −1 nm, an average outer diameter of 5.5 μm, and an average distance (Sm) between peaks of about 40 μm, and the remainder of which were indentations having an average valley depth (Rv) of −100 nm.

A magnetic recording medium was produced by the same procedures as described in Example 1 on the thus-textured silicon substrate.

Comparative Example 5

An aluminum substrate was subjected to a mechanical texture treatment by the conventional procedure. Thus, there were formed peaks and indentations on the textured surface, the peaks having an average peak height (Rp) of 25 nm, an average valley depth (Rv) shallower than −30 nm, and an average distance (Sm) between peaks of about 2.2 μm. A magnetic recording medium was produced by the same procedures as described in Example 1 on the thus-textured aluminum substrate.

CSS Characteristics

The CSS characteristics of the magnetic recording mediums produced in Examples 1 to 4 and Comparative Examples 1 to 5 were evaluated. The results are shown in Table 1.

TABLE 1

| Stiction value | | Stiction value | |
|---|---|---|---|
| Example 1 | 0.29 | Com. Ex. 1 | 0.45 |
| Example 2 | 0.31 | Com. Ex. 2 | 0.54 |
| Example 3 | 0.36 | Com. Ex. 3 | 0.55 |
| Example 4 | 0.34 | Com. Ex. 4 | 0.60 |
| | | Com. Ex. 5 | 0.82 |

As seen from Table 1, the magnetic recording mediums made by the process of the present invention including the surface texture treatment using a laser beam focusing at a ring-shaped band (Examples 1 to 4) exhibit considerably reduced stiction values, i.e., have excellent CSS characteristics, as compared with those of the conventional magnetic recording mediums including the surface texture treatment using a spot laser beam focusing (Com. Ex. 1 to 4).

EXAMPLE 5

A pulsed ultraviolet laser beam having a diameter of 10 μm was focused successively at 100 pulses on a substrate composed of soda lime glass by using the fourth harmonic generations (266 nm) of YAG laser at an energy density of 0.05 J/cm$^2$ and a pulse width of 20 ns. Thus, there were formed peaks and indentations on the textured surface, 60% of which were peaks having an average peak height (Rp) of 25 nm, an average valley depth (Rv) shallower than −1 nm, an average outer diameter of 7 μm, and an average distance (Sm) between peaks of about 25 μm.

A magnetic recording medium was produced by the same procedures as described in Example 1 on the thus-textured glass substrate.

EXAMPLE 6

A pulsed ultraviolet laser beam was focused successively at 80 pulses on a substrate composed of soda lime glass by using a KrF excimer laser (248 nm) and a mask at an energy density of 0.02 J/cm$^2$ and a pulse width of 15 ns. Thus, there were formed peaks and indentations on the textured surface, 70% of which were peaks having an average peak height (Rp) of 20 nm, an average valley depth (Rv) shallower than −1 nm, an average outer diameter of 6 μm, and an average distance (Sm) between peaks of about 35 μm.

A magnetic recording medium was produced by the same procedures as described in Example 1 on the thus-textured glass substrate.

Comparative Example 6

An ultraviolet laser beam having a diameter of 10 μm was focused at one pulse on a substrate composed of soda lime glass by using the fourth harmonic generations (266 nm) of YAG laser at an energy density of 5 J/cm$^2$. Thus, there were formed indentations on the textured surface, as illustrated in FIG. 3, which had an average outer diameter of 8 μm and an average valley depth (Rv) of −100 nm.

A magnetic recording medium was produced by the same procedures as described in Example 1 on the thus-textured glass substrate.

Comparative Example 7

An aluminum substrate was subjected to a mechanical texture treatment by the conventional procedure. Thus, there were formed peaks and indentations on the textured surface, the peaks having an average peak height (Rp) of 26 nm, an average valley depth (Rv) shallower than −30 nm, and an average distance (Sm) between peaks of about 2.2 μm. A magnetic recording medium was produced by the same procedures as described in Example 1 on the thus-textured aluminum substrate.

CSS Characteristics

The CSS characteristics of the magnetic recording mediums produced in Examples 5 and 6 and Comparative Examples 6 and 7 were evaluated. The results are shown in Table 2.

TABLE 2

| Stiction value | | Stiction value | |
|---|---|---|---|
| Example 5 | 0.45 | Com. Ex. 6 | 0.98 |
| Example 6 | 0.48 | Com. Ex. 7 | 0.82 |

As seen from Table 2, the magnetic recording mediums made by the process of the present invention including the surface texture treatment using a pulsed laser beam focusing (Examples 5 and 6) exhibit considerably reduced stiction values, i.e., have excellent CSS characteristics, as compared with that of the conventional magnetic recording medium including the surface texture treatment using a single laser beam focusing (Com. Ex. 6).

The texture treatment utilizing a laser ablation is advantageous over a mechanical texture treatment in that the shape and size of peaks formed on the surface can be controlled and burr formation can be avoided, and over a texture treatment utilizing lithography in that the production steps are not complicated and there is no need of waste disposal, and thus, the equipment cost is low.

In an embodiment of the present invention including the surface texturing step of focusing a laser beam a ring-shaped band, the energy density is distributed broadly in ring-shaped band areas, and thus, the size and shape of peaks can be uniform and precisely controlled. This is a contrast to the conventional texture treatment comprising focusing a pot laser beam, wherein it is difficult to concentrate radiant energy uniformly over the entire surface and to selectively form peaks of a desired shape, and thus, large recesses are undesirably formed by over-ablation and cracks are caused.

In another embodiment of the present invention including the step of focusing a pulsed laser beam at a relatively low energy density successively a plurality of times, the size, shape and frequency of peaks can be desirably varied and HD having excellent CSS characteristics can be obtained. This is also a contrast to the conventional texture treatment comprising focusing a single laser beam, wherein it is difficult to concentrate radiant of a high energy uniformly over the entire surface and to selectively form peaks of a desired shape, and thus, large recesses are undesirably formed by over-ablation and cracks are caused.

Thus, in accordance with the present invention, a magnetic recording medium having a high recording density and an improved wear characteristics can be obtained by a controllable procedure and at a high efficiency.

What is claimed is:

1. A process for producing a magnetic recording medium comprising a surface texture treatment step of focusing an ultraviolet laser beam in a ring-shaped band on a substrate composed of glass or silicon, followed by the formation of an undercoat, a magnetic layer, and a protective coating in this order on the surface-textured substrate.

2. A process for producing a magnetic recording medium according to claim 1, wherein the laser beam is focused in a ring-shaped band having an outer diameter in the range of 3 to 100 μm and a band width of 1 to 30 μm.

3. A process for producing a magnetic recording medium according to claim 1, wherein the laser beam is transmitted through an axicon prism to be thereby focused in a ring-shaped band.

4. A process for producing a magnetic recording medium according to claim 1, wherein the laser beam is transmitted through a mask to be thereby focused in a ring-shaped band.

5. A process for producing a magnetic recording medium according to claim 1, wherein the focusing of the laser beam is conducted to an extent such that peaks having an outer diameter of 1 to 50 μm and a height of 1 to 100 nm are formed on the textured surface of the substrate; said peaks occupying 0.1 to 99.9% of the entire surface of the substrate.

6. A process for producing a magnetic recording medium comprising a surface texture treatment step of focusing a pulsed ultraviolet laser beam at an energy density of at least 0.01 J/cm$^2$ but lower than the threshold level successively at least two times but up to 1,000 times on a substrate composed of glass or silicon, followed by the formation of an undercoat, a magnetic layer, and a protective coating in this order on the surface-textured substrate.

7. A process for producing a magnetic recording medium according to claim 6, wherein the pulsed laser beam is focused at an energy density of 0.02 to 0.2 J/cm$^2$.

8. A process for producing a magnetic recording medium according to claim 6, wherein the pulsed laser beam is focused successively 2 to 100 times.

9. A process for producing a magnetic recording medium according to claim 6, wherein the focusing of the laser beam is conducted to an extent such that peaks having an outer diameter of 1 to 50 μm and a height of 1 to 100 nm are formed on the textured surface of the substrate; said peaks occupying 0.1 to 99.9% of the entire surface of the substrate.

* * * * *